April 16, 1935.  F. WEVER  1,997,988
FURNACE LINING PROTECTION
Filed Aug. 27, 1932
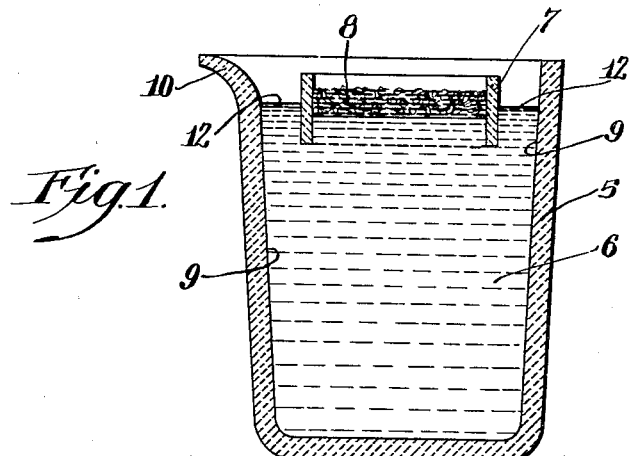
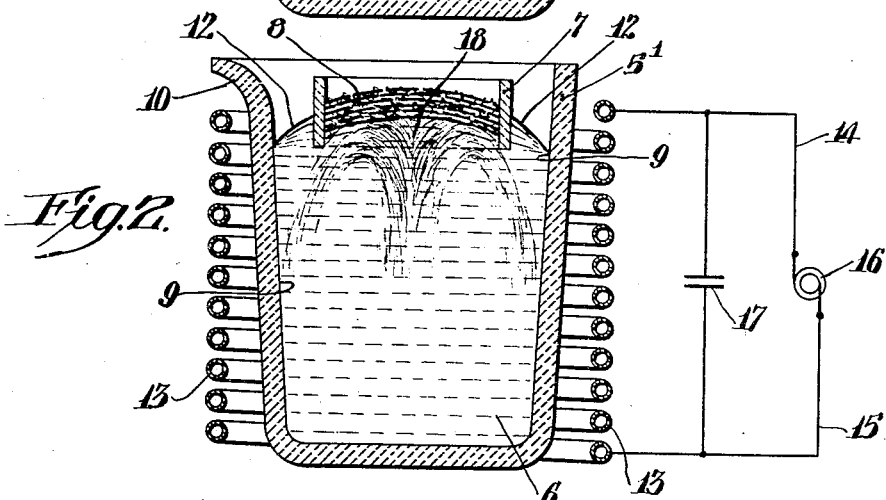
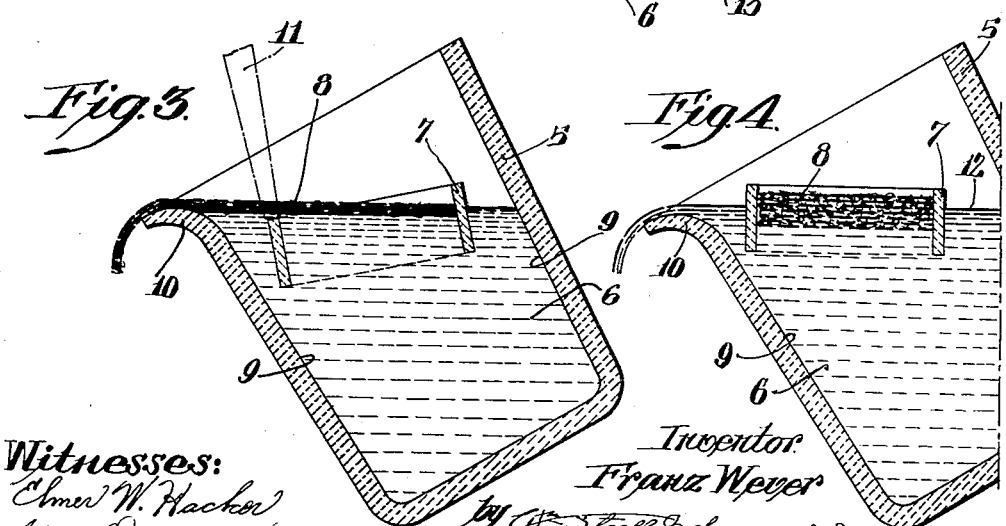

Patented Apr. 16, 1935

1,997,988

UNITED STATES PATENT OFFICE 1,997,988

FURNACE LINING PROTECTION

Franz Wever, Dusseldorf, Germany, assignor to Ajax Electrothermic Corporation, Ajax Park, N. J., a corporation of New Jersey Application August 27, 1932, Serial No. 630,695

5 Claims. (Cl. 75—22.5)

This invention relates to furnaces for the melting and refining of metals and deals with a method and means for shielding the side walls of the furnace from the damaging action of slags on top of the molten bath and for permitting an easy use of a succession of slags in the same furnace without damaging the lining thereof, irrespective of whether the furnace has an acid, basic or neutral lining and of whether the slags are some of them acid and some of them basic, that is, whether some of them are of a character to react with the furnace lining.

A purpose of the invention is to shield the lining of a furnace of the character indicated from the chemical or/and abrasive action of slags on top of and reacting with the molten metal of the bath.

A further purpose is to provide means whereby a basic slag may be used on the refining metal of a furnace having an acid lining or whereby an acid slag may be used on the refining metal of a furnace having a basic lining.

A further purpose is to allow both acid and basic slags to be used successively on a single molten charge of a furnace without injury to the furnace lining.

A further purpose is to float a refractory ring or slag pen upon the molten bath of a furnace of the character indicated, charging the slag that reacts with and refines the metal of the bath inside the ring or pen, using the floating ring or pen to prevent the slag from coming into contact with the furnace lining.

A further purpose is to make the material of the slag pen suit the character of the slag, using an acid refractory pen for acid slags and a basic refractory pen for basic slags.

A further purpose is to avoid need for shifting a molten charge out of one furnace into another in order to effect acid and basic slagging operations successively upon the same charge. I make the character of the furnace lining substantially independent of the character of the slag and optionally change the ring or pen container of the slag for a ring or pen of different acid or basic character when one slag is to be replaced by another having a different acid or basic character.

A further purpose is to combine a removable slag pen of the character indicated with a coreless induction furnace to avoid the abrasive action of turbulent slag stirred into continuous turbulence by the electromagnetic reaction of the inductor upon the molten charge.

A further purpose is to employ a floating pen either to retain the slag in the furnace while pouring the metal or to pour the slag from the top of the metal, while submerging the pen.

Further purposes will appear in the specification and in the claims.

While broadly applicable to and intended for any furnaces for the melting and refining of metals, my invention is particularly well suited to electric furnaces and has combination features with coreless induction furnaces.

I have elected to show two only of the different forms of my invention, selecting forms however that are practical and efficient in operation and which well illustrate the principles involved.

Figure 1 is a sectional elevation of a furnace charged with molten metal and provided with a slag pen in accord with the present invention, the furnace being intended for a conventional showing of any furnace to which the invention is adapted to be applied.

Figure 2 is a diagrammatic sectional elevation of a coreless induction furnace with a slag pen according to a desirable form of the invention.

Figure 3 is a diagrammatic sectional view illustrating one method of removing the slag from a slag pen of the character shown in Figure 1.

Figure 4 is a fragmentary view similar to Figure 3, showing use of a pen to hold the slag in the furnace while pouring the metal.

In the figures similar numerals refer to like parts.

Describing in illustration and not in limitation and referring to the drawing:—

The invention finds its best application in crucibles or furnaces for refining metal where the molten metal within the crucible is subjected to the refining action of one or more slags adapted to remove undesired components from the melt.

These slags are of different acid or basic character, according to the intended reactive function of the slag and have had hitherto usually a vicious action upon the lining of the crucible or furnace at the line of division between the slag and metal, an action that has been more vicious the further the compositions of the slag and lining are apart in acid and basic natures.

In general, hitherto the furnace linings have had to be subjected to contact with the reactive slags, and have thus needed to be of acid nature when the melt has had to be treated with an acid slag and of basic nature when the melt has had to be treated with a basic slag. Hitherto, when the refining has been a slagging process to be carried out by slagging the metal with first a basic slag and then with an acid slag or vice versa, the slagging operations have been usually in different furnaces, the melt having had to be shifted from furnace to furnace in order to have characters of furnace linings adapted to best withstand the deleterious actions of the differently natured slags.

I avoid the need for shifting a melt from furnace to furnace to suit differently reactive slags by segregating the slag from the furnace lining, slagging within a refractory ring or slag pen that presents at the outer limit of the slag an endless wall for some distance above and some distance below the surface of the molten metal.

Each furnace is optionally provided with more than one of these refractory slag pens made of chemically different refractories and for use in the furnace selectively, according to the acid or basic nature of the slag.

The rings or pens are for use in the furnace, one at a time and each is adapted to pen in the floating slag, segregating it from the lining of the furnace.

The slag pens are suitably of refractory material and of acid or basic nature according to the type of slag to be used in the melt.

When a melt is to be slagged with a succession of slags of different acid and basic characteristics the pen or ring may be changed to suit each change in the character of the slag.

Referring to Figure 1, a furnace or crucible 5 is shown with a melt of metal 6, the furnace or crucible, herein conventionally called a furnace, being optionally any crucible or furnace to which the invention is adapted to be applied.

Within the crucible floating on the metal 6 I provide a slag pen 7 that comprises a horizontally endless wall with top and bottom portions thereof respectively above and below the surface of the metal. The material of the pen and the sectional contour of the pen may both be widely varied, according to individual preference or/and to special furnace dimensions or conditions.

The slag 8 is charged into the interior of the slag pen 7 upon the surface of the melt and is thereby segregated from the furnace lining 9.

After a given slag has performed its function it may be removed either by skimming from within the pen, or usually more conveniently by pouring it off from the top of the melt in the usual way, first submerging the top of the pen in the molten metal at a side thereof adjacent the pouring spout 10 of the furnace, or optionally first lifting the pen out of the furnace.

The period of pouring is too short for any material deleterious action between the slag and lining.

Figure 3 illustrates removing the slag by pouring it from the top of the metal while retaining the slag pen 7 within the furnace.

As the furnace is tipped for pouring, the slag pen 7 is submerged by a suitable tool 11 at the side adjacent the spout which permits the slag to flow out the spout as clearly indicated in the figure and at the same time prevents the slag from spreading over the entire surface of the melt. After the slag has been poured off and the crucible returned to upright position fresh slag of the same or different composition may be added in the space inside the pen.

The slag pen floats on the metal and when the metal is poured the pen floats toward the spout. Optionally the metal may be poured without removing the slag from the pen, the pen in this event keeping the slag away from the spout, as shown in Figure 4, in which the metal is being poured while retaining the slag in the furnace.

The metal surface outside the pen between the pen and furnace lining may be protected from oxidation by any suitable or usual way, as by charcoal or protective slag 12 other than that within the pen. The slag within the pen will ordinarily be a refining or treating slag.

The device is particularly suited to use with coreless induction furnace and this is illustrated in Figure 2 where the inductor coil 13 is shown in operative position enclosing the furnace 5'.

The inductor coil, preferably water cooled, is energized by electric lines 14 and 15 to an alternating current supply 16. Capacitors 17 are connected in parallel with the inductor coil for power factor correction.

In this type of furnace there is a vigorous and characteristic stirring of the molten metallic charge during the operation of the furnace due to electromagnetic forces. These forces are of complex nature but cause a vigorous upward flow along the central axis of the furnace, elevating the top surface of the metal as indicated at 18 to a high crowned meniscus, the metal flowing radially outward from the central crown.

The metal is forced up turbulently along the central axis of the bath which is inside the floating slag pen and is carried radially from the center of the pen to the sides, the walls of the pen preventing the turbulent action from reaching the lining of the furnace. At the same time, intimate contact between the metal and the slag in the pen is made possible, to refine the metal.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention, what I claim as new and desire to secure by Letters Patent is:—

1. In the slagging of metal within a coreless induction furnace with a floating slag whose chemical character is opposed to, that is, such as to make the slag react with, the furnace lining, the method of protecting the furnace lining from the floating slag which consists in penning the slag to a portion of the top surface of the molten metal that is spaced inwardly from the furnace lining by walls which are nonreactive with respect to the slag.

2. The method of operating a furnace to slag the content and at the same time protect the lining of the furnace from the slag, which consists in circulating the furnace content upwardly at a part of the furnace spaced from the furnace walls and terminating at the surface of the content, in supplying a treating slag and in confining the treating slag to a portion of the furnace at which the circulation takes place and out of contact with the furnace walls.

3. The method of protecting an acid lining of a furnace containing a molten bath from engagement with a basic treating slag, which consists in confining the treating slag within non-acid walls spaced from the acid lining of the furnace.

4. The method of protecting a basic lining of a furnace containing a molten bath from engagement with an acid treating slag, which consists in confining the treating slag within non-basic walls spaced from the basic lining of the furnace.

5. The method of purifying the metal of a molten bath within a furnace, which consists in slagging the metal with a succession of slags while concurrently excluding the slags from the furnace lining and concurrently electrically inductively heating and stirring the metal of the bath.

FRANZ WEVER.